United States Patent [19]

Bouiller et al.

[11] Patent Number: 4,586,225
[45] Date of Patent: May 6, 1986

[54] APPARATUS FOR THE TRANSFER OF A COMPLETE TURBINE MODULE FROM A BALANCING MACHINE TO AN ENGINE AND VICE VERSA, AND METHOD FOR OPERATING THE SAID APPARATUS

[75] Inventors: Jean G. Bouiller, Brunoy; Jean-Claude L. Delonge, Corbeil-Essonnes, both of France

[73] Assignee: Societe Nationale d'Etude et de Construction de Moteurs d'Aviation S.N.E.C.M.A., Paris, France

[21] Appl. No.: 594,904

[22] Filed: Mar. 29, 1984

[30] Foreign Application Priority Data

Apr. 15, 1983 [FR] France .................. 83 06157

[51] Int. Cl.⁴ .................. B21K 3/04; B23P 19/00
[52] U.S. Cl. .................. 29/156.8 R; 29/426.1; 29/464; 29/559; 29/700; 29/822; 73/455; 73/460; 414/589; 414/786
[58] Field of Search .................. 29/156.4 R, 156.8 R, 29/426.1, 426.2, 464, 559, 700, 822, 823, 824; 73/66, 455, 460; 74/573 R; 301/5; 414/589, 786, 787

[56] References Cited

U.S. PATENT DOCUMENTS

| | | | |
|---|---|---|---|
| 2,338,293 | 1/1944 | Martin | 73/455 |
| 2,624,473 | 1/1953 | Corder | 414/589 |
| 2,749,026 | 6/1956 | Hasbrouck et al. | 29/156.8 R |
| 2,798,383 | 7/1957 | Van Cleave | 74/573 |
| 3,146,623 | 9/1964 | Ehrsam, Jr. et al. | 73/460 |
| 3,916,495 | 11/1975 | Klassen et al. | 29/156.4 R |
| 3,964,342 | 6/1976 | Beam, Jr. et al. | 74/573 R |
| 4,059,972 | 11/1977 | Beam, Jr. et al. | 74/573 R X |
| 4,118,847 | 10/1978 | Mansson et al. | 29/156.8 R |
| 4,451,979 | 6/1984 | Schuster | 29/156.8 R X |
| 4,455,887 | 6/1984 | Lissajoux et al. | 74/573 R |

FOREIGN PATENT DOCUMENTS

645994 11/1950 United Kingdom .
596538 5/1978 U.S.S.R. .................. 29/700

Primary Examiner—Howard N. Goldberg
Assistant Examiner—Ronald S. Wallace
Attorney, Agent, or Firm—Oblon, Fisher, Spivak, McClelland & Maier

[57] ABSTRACT

Apparatus for the transfer of a module, the module including an outer casing in which is held the stator stage and a turbine rotor constituted by disks supporting blade rows, the disks being held by tie bolts, the apparatus having a holding device of the outer casing on the balancing machine, a temporary interconnection means of the disks of the turbine, and a transport device ensuring the securing of the turbine disks after withdrawal of the holding device.

6 Claims, 8 Drawing Figures

APPARATUS FOR THE TRANSFER OF A COMPLETE TURBINE MODULE FROM A BALANCING MACHINE TO AN ENGINE AND VICE VERSA, AND METHOD FOR OPERATING THE SAID APPARATUS

BACKGROUND OF THE INVENTION

1. Field of the Invention

The invention relates to apparatus for the transfer of a complete turbine module from a balancing machine to an engine and vice versa, the turbine rotor being secured to the transmission shaft of the engine by an array of tie bolts and a method of operating the apparatus.

2. Summary of the Prior Art

Engineers assembling turbine engines, particularly those intended for aircraft, have attempted to simplify maintenance operations so that they can be effected even in scantily equipped workshops. One solution consisted in forming the sub-assemblies in modular form, the more important modules being such as to enable their ready replacement. However, the production of the turbine stage as a module has not totally resolved the problem. In practice the high speeds to which the rotor blades are subjected necessitate very precise balancing, which balancing must not be disturbed during the reassembly of the turbine on the other sub-assemblies or modules of the engine. The current solution consists in balancing the rotor alone on a balancing machine, then reassembling the rotor on the engine, the stator stages being assembled after the coupling of the rotor to the engine shaft. A similar method is described in U.S. Pat. No. 3,916,495 for assembling a turbine rotor constituted by two interconnected disks and to the engine transmission shaft by an axial array of tie-bolts. The rotational torque is transmitted between the disks and between one disk and the shaft by drive rings with conical teeth. The rotor is balanced on a machine the shaft of which has the same characteristics as those of the engine and of drive ring of which is identical. The balancing is effected in a known manner and is controlled by the addition of masses, having the form of plugs, clamped under the nuts of the tie bolts.

After balancing, the rotor is removed from the machine and can be reassembled on an engine without the necessity of rebalancing if the relative positions of the balancing masses are maintained.

The balancing of the rotor independently of other parts of the engine constitutes an appreciable simplification, since it enables maintenance in workshops which do not have a balancing machine. However, the mounting, after assembly of the rotor on its shaft, of stator blades can be the cause of damage to the labyrinths as a result of extremely small clearances and can cause a loss which is not negligible, in the efficacy of the assembly.

The apparatus and the method according to the invention have as their objective the balancing of a turbine rotor in its stator. The assembly constituting the turbine module can be readily coupled to a shaft while avoiding unbalancing of the rotor and/or damaging of the labyrinths. These results are obtained thanks to the maintenance devices and transport devices enabling the security of the balancing and the guidance of the module during its mounting in the engine.

SUMMARY OF THE INVENTION

According to the present invention there is provided an apparatus for transferring a turbine module from a balancing machine to an engine assembly and vice versa, the module comprising an external rating of the inlet guide nozzle array of the turbine within which the stator stage of the turbine is also mounted, the turbine rotor incorporating disks and blade rows which rotor can be secured to the transmission shaft of the engine by tie bolts array around the rotor axis and extending longitudinally of the axis, and a bell housing at the downstream end of the rotor carrying a mounting seating, said apparatus comprising means for mounting said external casing on a balancing machine, means for temporarily interconnecting the disks of the rotor, and transport means for providing interconnection of the turbine disks after withdrawal from the balancing machine.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENT

The modular construction of certain important parts of an aircraft gas turbine engine enables overcoming in a simple and quick manner a defect which may arise in a member or an assembly by exchanging the defective module for another module which is new, or has been reconditioned. This method is particularly useful in the case of the high pressure turbine of which the elements are adjusted and balanced with high precision.

Figure 8:
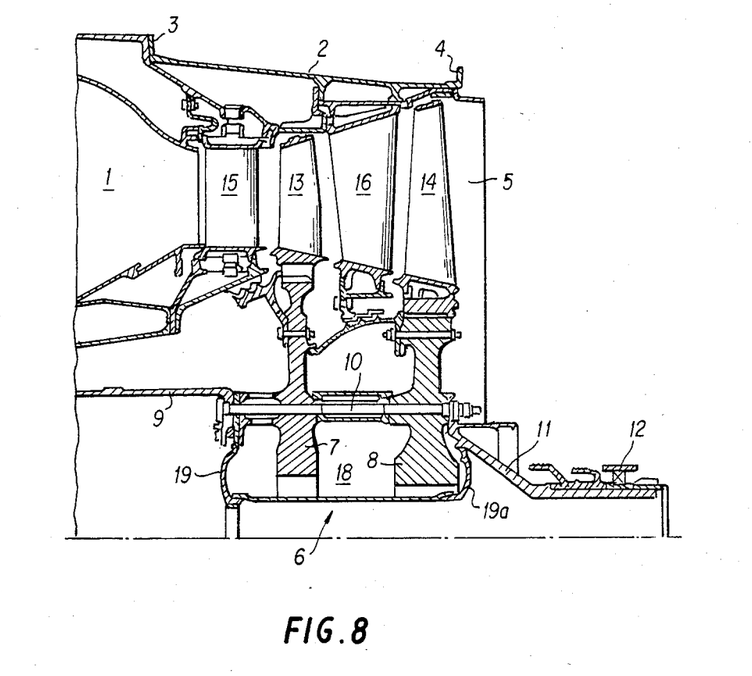
FIG. 8 is a half view in section of the turbine module mounted on the combustion chamber module.

FIG. 8 shows a high pressure turbine module mounted in an engine and more precisely downstream of the section or of the module of the combustion chambers 1. In the example illustrated, the turbine module is bounded by an external casing of the inlet guide nozzle array, provided with upstream flanges 3 and downstream flanges 4 for securing purposes, at the front, to the combustion chamber section 1, and, to the rear, to the nozzles 5. The fixed and movable blade rows constituting the high pressure turbine lie between these two components. The rotor is constituted by two disks 7 and 8 respectively carrying the rotor blades 13 and 14. The two disks support one another and are secured to the transmission shaft 9, which drives the high pressure compressor, by tie bolts 10 which are evenly distributed around the rotor axis. In the mounting illustrated, the tie bolts provide, in addition to the securing function, the function of transmission of rotary motion.

The rotor is mounted rearwardly on a bell-housing 11 which cooperates with a rear support bearing 12 of the shaft. The rotor blades 13 and 14 receive the flow of combustion gas respectively through a ring of adjustable stator blades 15 provided in the combustion chamber module and through a ring of fixed stator blades 16 mounted on the external casing of the turbine module.

Figure 1:
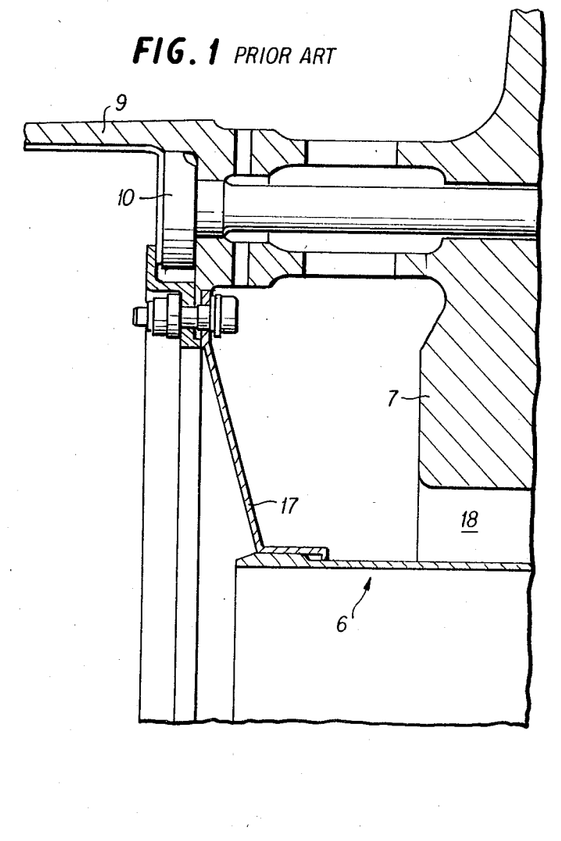
FIG. 1 shows a portion of the front part of a convention turbine rotor.

Conventionally, the outer periphery of an internal tube 6, with its two upstream rings 19 and downstream rings 19a defines a volume 18 surrounding the disks through which cooling air flows. FIG. 1 shows in an enlarged scale a portion of the internal upstream part of a conventional turbine rotor. The upstream part 17, as well as the downstream part, are constituted by conical rings which engage a central cylindrical wall and enable the securing of the internal tube 6 in a fluidtight manner to the front of the rotor shaft and at the rear on to the bell housing 11. The mechanical forces which support these rings 17 are very limited and the internal tube 6 as here conceived cannot form a mechanical connection between the shaft of the rotor and the bell housing, and effectively support the disks 7 and 8.

One feature of the preferred embodiment consists in the provision of temporary means for connecting the internal surface of the internal tube 6 and the bell housing 11. To do this, the upstream conical ring 17 is replaced (FIG. 2) by a ring 19 secured to the disk 7 and having an improved mechanical rigidity and of which the internal edge portion 21 constituting a part of the internal surface of the internal tube 6 has a screw thread 26 arranged to cooperate with the screw thread of a presecuring bolt which will be described hereinafter.

Figure 2:
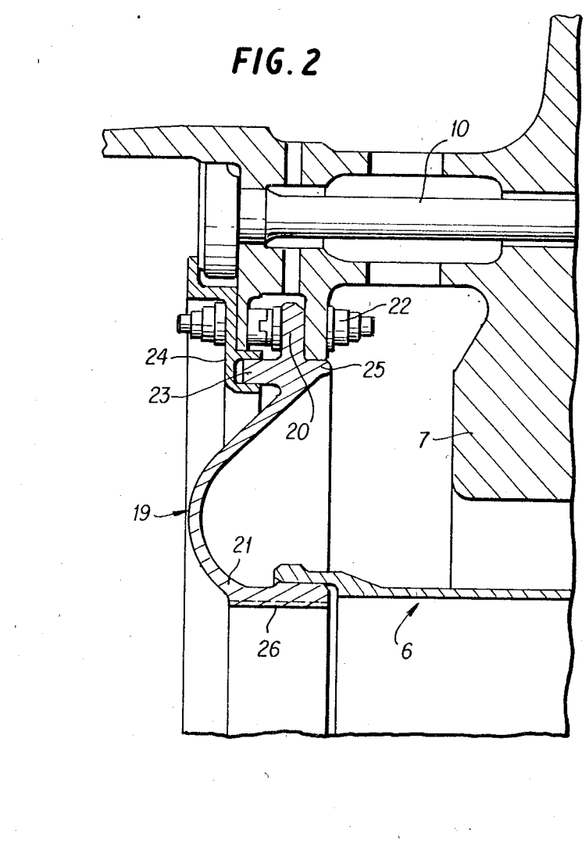
FIG. 2 is a view of the portion shown in FIG. 1 having a rotor modified to incorporate a component of an apparatus in accordance with the invention.

The ring 19 is convex in the upstream direction. Seen in section, the radially outer edge portion 20 and internal edge portion 21 are perpendicular to one another, the edge portion 20 being in a radial plane of the module has at its periphery holes for the passage of bolts 22 for securing it to the disk 7. There is also provided concentrically with the edge portion and inwardly of the row of holes, a first annular ridge 23 perpendicular to one face of the edge portion 20 and extending in the same sense as the convexity of the ring 19, enabling the location of quadrant plates 24 for holding the tie bolts 10 and a second annular ridge 25, perpendicular to the other face of the edge portion 20 and directed in the opposite sense, enabling the location of the internal tube 6 with respect to the disk 7.

Figure 3:
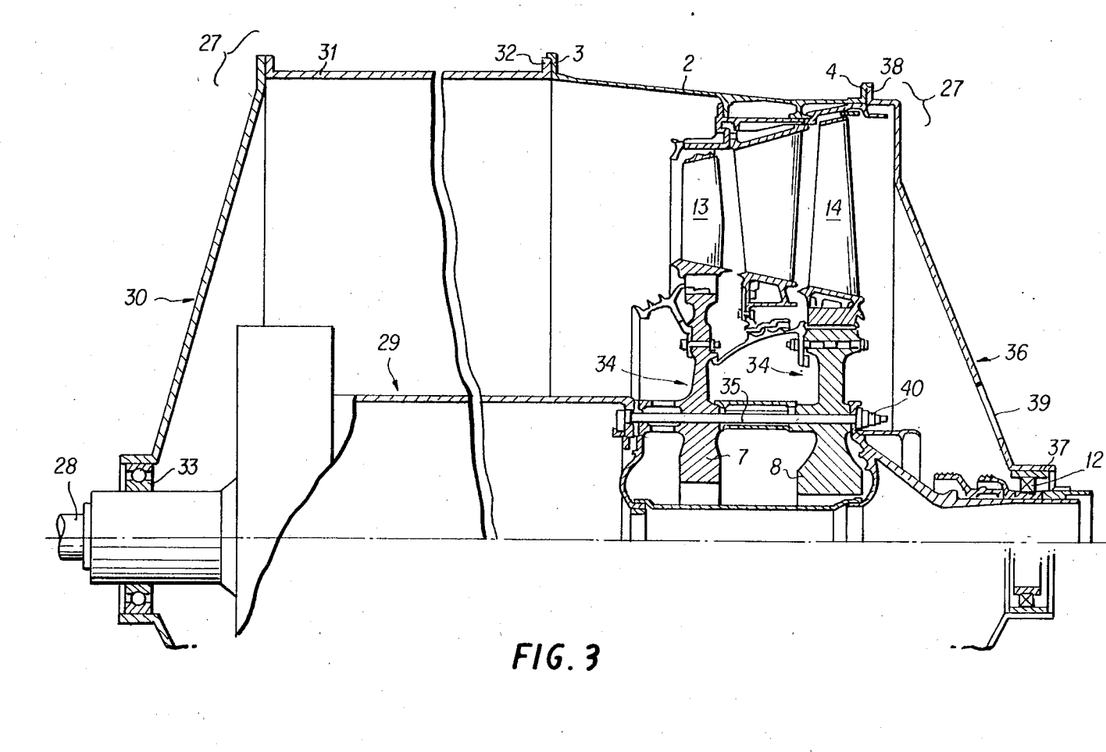
FIG. 3 is a half view in section of a turbine module when mounted on the balancing machine by a mounting device forming another component of apparatus in accordance with the invention.

FIG. 3 is a partial, sectional, view of the module of the whole turbine, that is to say the rotor in place within the stator, supported in the mounting device 27, constituting a part of the apparatus in accordance with the invention. The output shaft 28 of the balancing machine is coupled by a cardan joint to the main shaft 29 of which the mass is equivalent to that of the high pressure compressor rotor of the engine. The front part 30 of the mounting device 27, forms the casing and is constituted by a cylindrical wall 31 closed by a conical base, and furthermore supports on its axis a bearing 33 mounted on the main shaft 29. The edge of the cylindrical wall 31 carries a flange 32 for securing the flange 3 of the inlet guide nozzle array casing 2 of the turbine module. The turbine rotor 34, formed by disks 7 and 8 and by blade rows 13, 14 is secured to the end of the shaft 29 by tie bolts 35 identical to tie bolts 10 serving for connecting of the turbine to the transmission shaft 9 (FIG. 8). The rear of the module is closed off by a rear part 36 of the mounting device 27. This part has the form of a conical base provided with a cylindrical part 37 with which it is coaxial and arranged to cooperate with the bearing 12 mounted on the bell housing 11 of the module. The external edge of the base is provided with a flange 38 comprising means for securing it to the rear flange 4 of the module. The base 36 has opposite to the tie bolts 35 openings 39 giving access to the nuts 40 for securing the tie bolts 35.

Figure 4:
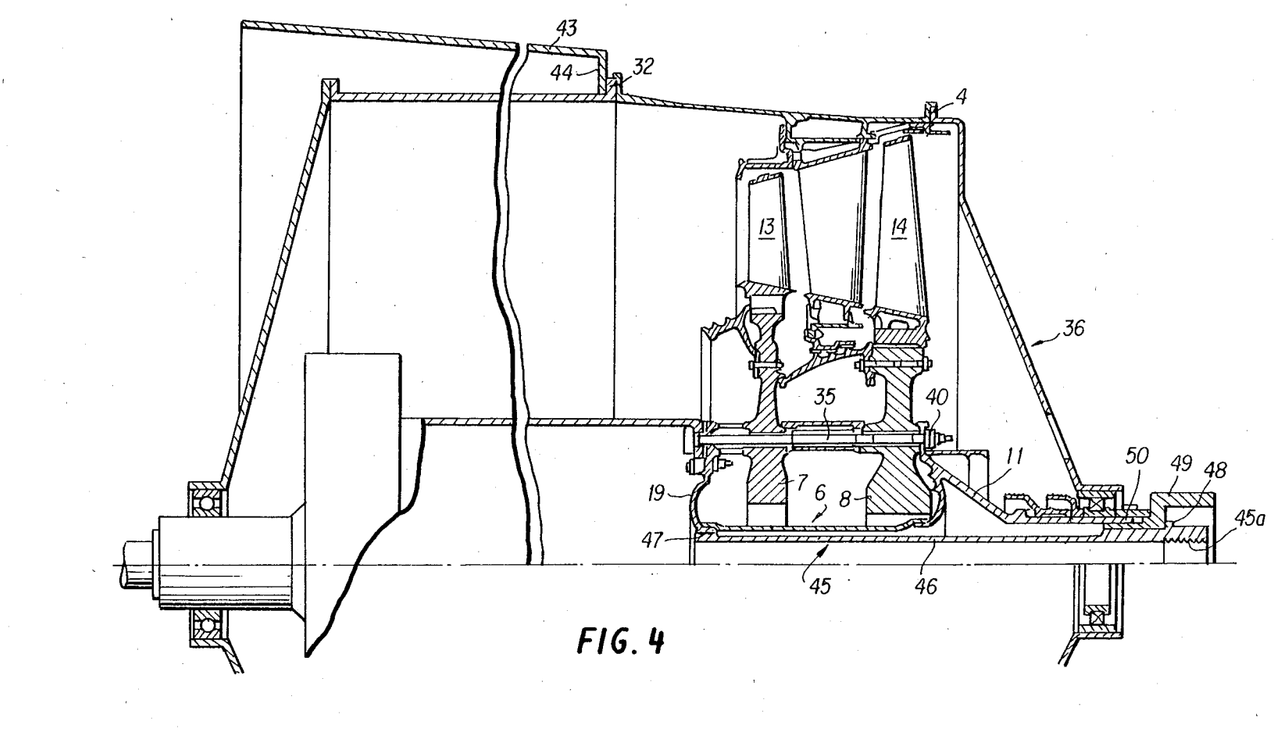
FIGS. 4, 5 and 6 show various stages of disassembly of the mounting device and of mounting of a transport device forming components of an apparatus in accordance with the invention.

When the balancing has been effected, the assembly is withdrawn from the balancing machine (FIG. 4) and then disposed in a vertical position in a demounting structure 43 comprising means 44 cooperating with the flange 32 of the mounting device. Thus the turbine module is prepared for transport whilst carrying out the operations hereinbefore referred to.

There is introduced along the axis of the bell housing 11 at the rear part of the mounting device, a clamping screw member 45 constituted by a tubular body 46 of which the front end portion carries on the external surface a screw thread 47 capable of cooperating with the screw thread 26 of the ring 19, and the internal tube 6 (FIG. 2). The other end portion of the clamping screw member 45 has a head formed by a small abutment collar 48 against which a centering ring 49 is engaged. This ring 49 cooperates at least in part with the internal support 50 of the bell housing 11 and forms an abutment for the end of the bell housing. The clamping screw 45 is screwed tight so as to lock against the end of the bell housing. The rotor disks 7 and 8 are then locked against the ring 19 of the internal tube 6 and the bell housing and it is then possible to proceed to the unscrewing of the nuts 40 of the tie bolts 35 which secure together the turbine disks, the two disks remaining rigid with one another by the axial force introduced by the clamping screw member 45.

Figure 5:
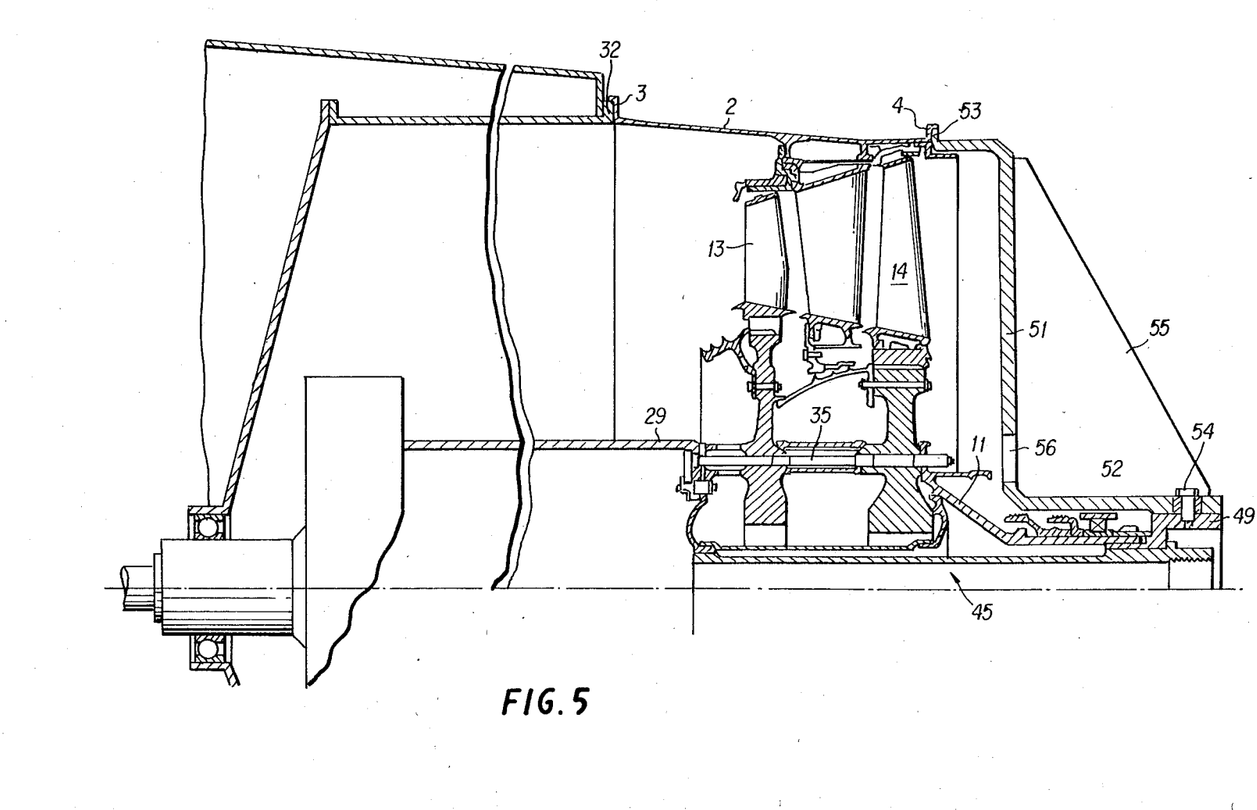

The securing means are disassembled whilst maintaining the rear part 36 of the mounting device on the flange 4 of the turbine module. This part is withdrawn and is replaced (FIG. 5) by the rear part 51 of a transport device which has been secured on the flange 4 and on to the centering ring 49 of the clamping screw 45. The rear part 51 of the transport device forms a casing enclosing the rear part of the turbine module and is constituted, in the embodiment illustrated, by a circular disk with a edge portion comprising a central opening to which is secured a sleeve 52 coaxial therewith and directed in the opposite sense to the edge portion. The outer edge portion carries a flange 53 capable of being secured by securing means to the flange 4 of the outer casing of the turbine module. The sleeve 52 has dimensions such that it can be placed against the rear part of the bell housing 11 and can be fixed thereto by bolts 54 onto the centering ring 49. Webs 55 are provided between the disk and the sleeve. Openings 56 in the disk 51 enable access to the nuts of the tie bolts.

Figure 6:
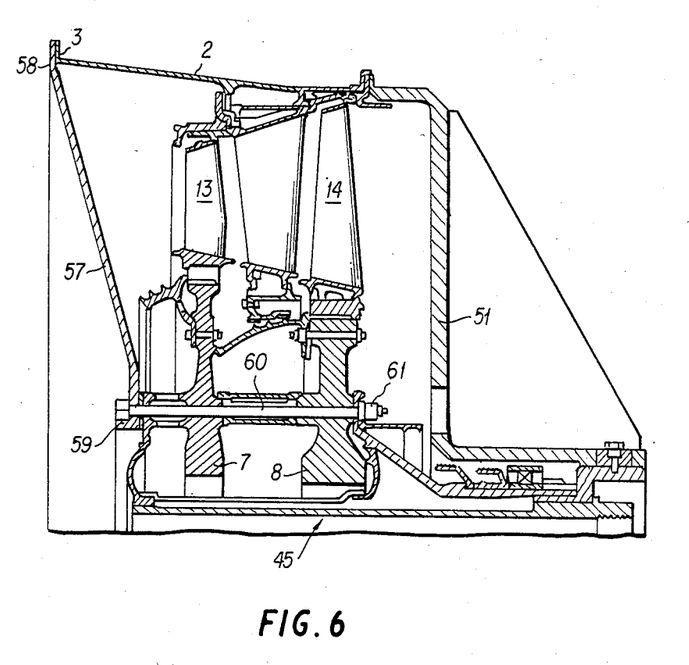

When the rear part of the transport device is secured to the casing 2 and to the centering ring 49 of the mounting screw member 45, the connection between the flanges 32 and 3 of the securing device of the casing 2 is omitted and, for example, by a means of lifting ring secured in a screw threaded part 45a, at the rear end of the mounting screwed member 45, the turbine module is raised so as to disengage the rotor from the tie bolts 35 which remain attached to the end of the main shaft 29. The front of the turbine module is then closed off by the front part 57 of the transport device which has (see FIG. 6) the form of an annular frusto-conical base of which the outer edge portion 58 is secured beneath the flange 3 of the casing, and the internal edge portion 59 is secured to the turbine rotor by tie bolts 60 which hold the disks by locking the nuts 61.

The disks 7 and 8 are thus held by tie bolts 60 and the mounting screw member 45.

After the transport operation and possibly holding the turbine module in stock for a time, balanced within its transport device, and it is then desired to mount it in an engine, the front part 57 of the transport device is disassembled by unscrewing the nuts 61 holding the tie bolts 60 and disconnecting of the edge portion 58 of the flange 3 of the casing 2 of the inlet guide nozzle array.

Figure 7:
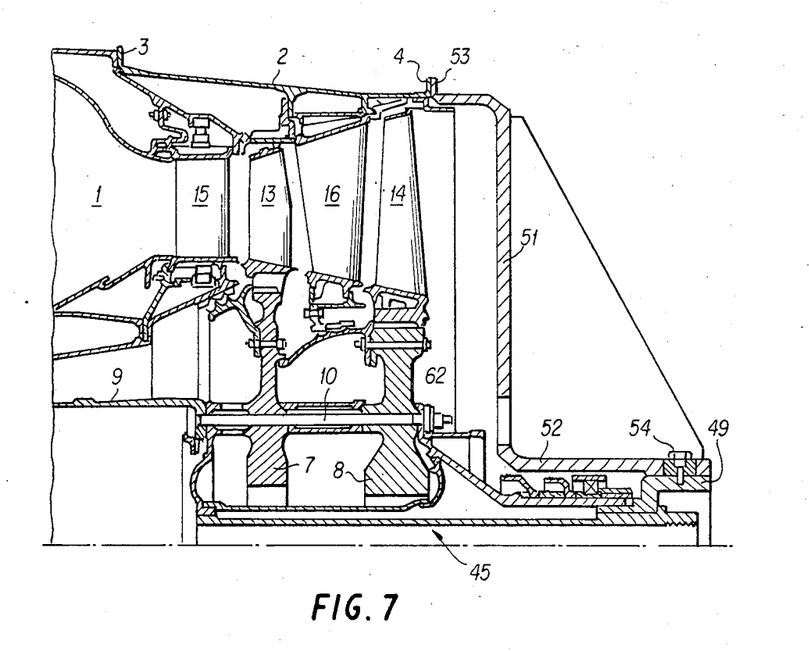
FIG. 7 shows a phase during the mounting of the turbine module on the combustion chamber module.

The turbine module is then offered up beneath the engine (see FIG. 7), the tie bolts 10 located on the transmission shaft 9 engaging themselves in securing holes of the disks 7 and 8 and thus guide the assembly into position. Flange 3 of the casing 2 is secured to a corresponding flange of the combustion chamber 1. The nuts 62 are screwed on the tie bolts 10 then the rear part 51 of the transport device is disassembled by removal of the bolts 54 securing the sleeve 52 on the centering ring 49 by the mounting screw member 45 and the flange 53 is disconnected from the transport device together with the flange 4 of the turbine module.

The operations of disassembly of a turbine module of an engine can also be carried out whilst using the same apparatus, the sequence of operations being inverted.

The apparatus for the transport of a turbine module in accordance with the invention broadly includes:

(i) a mounting device providing for clamping of the external casing 2 of the inlet guide nozzle array and the stator stage on the balancing machine during the balancing of the turbine rotor;

(ii) means for temporarily securing together the turbine disks; and (iii) a transport device providing for connection of the turbine disks after the withdrawal from the balancing machine.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for transferring a turbine module from a balancing machine to an engine assembly and vice versa, the module comprising an external casing of the inlet guide nozzle array of the turbine within which the stator stage of the turbine is mounted, the turbine rotor incorporating disks and blade rows and is secured to the transmission shaft of the engine by tie bolts positioned in an array around the rotor axis and extending longitudinally of the axis, and the module further comprising a bell housing at the downstream end of the rotor and carrying a mounting seating, said apparatus comprising:

means for mounting said external casing on a balancing machine, means for interconnecting temporarily the disks of the rotor, and transport means providing for interconnection of the turbine disks after withdrawal from the balancing machine wherein said means for mounting said external casing further comprises, an upstream part with a conical base having a seating enabling mounting of the module on the balancing machine, a downstream edge portion having a flange for securing the means for mounting said external casing to said external casing of the module, and a downstream part carrying an internal, cylindrical, portion co-axial and cooperating with said mounting seating of the bell housing and further comprising, flange means arranged at an outer, peripheral edge thereof to be secured to a downstream flange of said external casing of the module.

2. Apparatus according to claim 1, wherein said means for temporarily interconnecting the disks of the rotor further comprises a ring having a screw thread at the inner edge portion thereof, an internal tube having a first screw thread screwed to the screw thead of the ring, and having a second screw thread, a tubular member coaxial with and lying inwardly of the internal tube, said tubular member having a screw thread engaged with the second screw thread of the internal tube and having means at the downstream end thereof arranged to cooperate with the seating of the bell housing.

3. Apparatus according to claim 1, wherein said means for temporarily interconnecting the disks to the rotor further comprises a ring having a screw thread at the inner edge portion thereof, an internal tube having a screw thread screwed to the screw thread of the ring, and having a second screw thread, a tubular member coaxial with and lying inwardly of the internal tube, said tubular member having a screw thread engaged with the second screw thread of the internal tube and having means at the downstream end thereof arranged to cooperate with the seating of the bell housing.

4. Apparatus according to claim 2, wherein the means at the downstream end of the internal tube to cooperate with the seating of the bell housing further comprises an abutment collar and a centering ring abutting the collar and the seating of the bell housing.

5. Apparatus according to claim 1, wherein the transport means comprises a frusto-conical, upstream, base with an outer edge portion adapted to be secured to an upstream flange of said external casing, an inner edge portion arranged to be secured to the turbine rotor, a plurality of tie bolts serving to secure the inner edge portion of the turbine rotor, the a downstream part including a circular disk having a central opening, a sleeve secured around the opening coaxial with the axis of the module and a flange located at the outer edge of the disk whereby the downstream part can be secured to the module.

6. A method of transferring a complete turbine module between an engine assembly and a balancing machine and subsequently from the balancing machine to an engine assembly, the module incorporating an external casing of the inlet guide nozzle array of the turbine within which the stator stage of the turbine is mounted, the turbine rotor incorporating disks and blade rows and being secured to the transmission shaft of the engine by tie bolts positioned in an array around the rotor axis and extending longitudinally of the axis, the module further comprising a bell housing at the downstream end of the rotor and carrying a mounting seating, the method comprising the steps of I. balancing the turbine rotor within the module including the steps of:
   (a) securing an upstream part of the external casing of the inlet guide nozzle array to an upstream part of mounting means,
   (b) securing the rotor of the turbine to the shaft of the balancing machine by tie bolts,
   (c) securing the downstream part of the mounting means to a downstream part of the external casing of the inlet guide nozzle array, the cylindrical part of the downstream part of the mounting means cooperating with the seating remaining mounted on the bell housing, and
   (d) balancing of the rotor,
II. transferring the turbine module, the rotor having been balanced, including the steps of:
   (a) withdrawing the shaft assembly mounting means and turbine module from the balancing machine and placing the module in a vertical position within a disassembling means,
   (b) locating a clamping screw member along an axis of said bell housing,
   (c) unscrewing of the nuts of the tie bolts of the shaft of the balancing machine,
   (d) removing the rear part of the mounting means,
   (e) locating the downstream part of the transport device on a flange of the turbine module,
   (f) disassemblying the casinag of the inlet guide nozzle array from the front part of the mounting means, the front part and the tie bolts remaining in place on the shaft of the balancing machine, and
   (g) locating the front part of the transfer device secured with the aid of the said tie bolts and securing the disks; and
III. locating the turbine module in the engine including the steps of:
   (a) removing the transfer tie bolts of the front part of the transfer means,
   (b) presenting the module to the engine, then securing tie bolts remaining on the transmission shaft in securing holes of the disks, and guiding the assembly into position,
   (c) securing the casing of the inlet guide nozzle array of the module on the casing of the combustion chamber, and
   (d) removing the rear part of the transport means.

* * * * *